US006981719B2

(12) United States Patent
Igawa

(10) Patent No.: US 6,981,719 B2
(45) Date of Patent: Jan. 3, 2006

(54) AIRBAG DEVICE

(75) Inventor: Tadahiro Igawa, Shiga (JP)

(73) Assignee: Takata Corporation, Tokyo (JP)

( * ) Notice: Subject to any disclaimer, the term of this patent is extended or adjusted under 35 U.S.C. 154(b) by 73 days.

(21) Appl. No.: 10/365,536

(22) Filed: Feb. 13, 2003

(65) Prior Publication Data

US 2003/0168842 A1 Sep. 11, 2003

(30) Foreign Application Priority Data

Mar. 7, 2002 (JP) ............................ 2002-062272

(51) Int. Cl.
*B60R 21/16* (2006.01)

(52) U.S. Cl. ................................ 280/743.2; 280/743.1

(58) Field of Classification Search ............ 280/743.1, 280/743.2
See application file for complete search history.

(56) References Cited

U.S. PATENT DOCUMENTS 5,678,858 A * 10/1997 Nakayama et al. ...... 280/743.2
6,254,130 B1 * 7/2001 Jayaraman et al. ...... 280/743.2
6,736,426 B2 * 5/2004 Winters et al. .......... 280/743.2
2001/0033072 A1 10/2001 Kumagai et al.
2001/0035639 A1 11/2001 Amamori

FOREIGN PATENT DOCUMENTS

| | | | | |
|---|---|---|---|---|
| GB | 2 261 855 | A | * | 6/1993 |
| GB | 2 262 916 | | | 7/1993 |
| JP | 1-247242 | | | 10/1989 |
| JP | 2-37060 | A | * | 2/1990 |
| JP | 02299952 | A | * | 12/1990 |
| JP | 6-286543 | | | 10/1994 |
| JP | 8-11657 | A | * | 1/1996 |
| JP | 2001-270405 | A | * | 10/2001 |
| WO | 01/34436 | | | 5/2001 |

* cited by examiner

*Primary Examiner*—Ruth Ilan
(74) *Attorney, Agent, or Firm*—Manabu Kanesaka

(57) ABSTRACT

A front panel and a rear panel of an airbag are connected to each other by a strap. Both ends of the strap are connected to the rear panel, and an intermediate portion thereof passes through openings of strap inserting members provided in an upper portion and a lower portion of the front panel. After the airbag is inflated, when an occupant comes to contact with the lower portion of the front panel, the lower portion of the front panel retreats and the restriction on the upper portion of the front panel by the strap is relieved by the sliding of the strap. Thus, the upper portion of the front panel is further expanded forwardly.

5 Claims, 10 Drawing Sheets

10
17
18A
16
11
15A
35
31
31a
16
18B
34
33
32
17
33
15B
34
10a
30
36
10b 10a
16
18A
18B
19
19
17
17
11
14b
14
15A
15B
14a
14b
20
20
21
21
13
13
12
10b

AIRBAG DEVICE

DETAILED DESCRIPTION OF THE INVENTION

The present invention relates to an airbag device for deploying an airbag to protect an occupant in case of an emergency such as a vehicle collision, and more specifically, relates to an airbag device that adjusts an area of an airbag for protecting an occupant during a process of deploying the airbag.

Generally, an airbag device for a vehicle comprises an airbag and an inflator for expanding the airbag, and is constructed such that in case of an emergency such as a vehicle collision, the inflator ejects and supplies a gas to the airbag for expanding the airbag in the vehicle.

In order to decrease front and back bulges or sizes of the airbag, that is, a length of the airbag protruded toward an occupant when the airbag is expanded, it is known that there is an airbag device in which a front side (an occupant side) and a rear side of the airbag are connected by a strap.

When the gas ejected from the inflator inflates the airbag, the strap becomes tight and thus, the front side of the airbag is limited to protrude toward the occupant in a certain extent.

An object of the present invention is to provide an airbag device in which the forward protrusion of an expanded airbag is limited by a strap, and in which when a lower portion of the expanded airbag receives an abdominal vicinity of an occupant, an upper portion of the airbag is further expanded toward the occupant to receive the head portion of the occupant.

Further objects and advantages of the invention will be apparent from the following description of the invention.

SUMMARY OF THE INVENTION

An airbag device of the present invention comprises an airbag having a front surface facing an occupant and a rear surface opposite to the front surface, and an inflator for expanding the airbag. Strap inserting members are provided in an upper portion and a lower portion of the front surface of the airbag, respectively. Further, a strap is disposed within the airbag, and has both ends connected to the rear surface side of the airbag and an intermediate portion passing through each of the strap) inserting members.

The airbag device of the present invention is provided in a vehicle as an airbag device for protecting an occupant. In this airbag device, the airbag is expanded by a gas from the inflator in case of an emergency such as a vehicle collision.

Since the front surface side and the rear surface side of the airbag are connected through the strap, the expansion of the airbag toward the occupant is restricted.

In case the occupant comes to contact with the airbag, when the abdominal vicinity of the occupant comes to contact with the lower portion of the front surface of the airbag, the lower portion of the front surface of the airbag retreats toward the rear surface of the airbag while absorbing the kinetic energy of the occupant.

When the lower portion of the front surface side of the airbag retreats, the lower half of the strap restricting the forward expansion of the lower portion of the front surface side of the airbag becomes loose as the front surface of the airbag retreats. Accordingly, since the upper half of the strap restricting the forward expansion of the upper portion of the front surface of the airbag pulls the lower half of the strap, the lower half of the strap is shifted by the loose portion from the strap inserting members to the upper half, thereby increasing the length of the upper half of the strap. As a result, the restriction by the upper half of the strap is relieved, and thus the upper portion of the front surface of the airbag is further expanded forward.

As a result, the further expanded upper portion of the airbag receives the head portion of the occupant coming to contact with the upper portion of the airbag, and thus impact inflicted on the head portion can be more effectively absorbed.

In the airbag device of the present invention, the strap inserting members may be provided in a left portion and a right portion of the front surface of the airbag, respectively. The strap disposed within the airbag may be provided such that both ends thereof are connected to the rear surface side of the airbag and an intermediate portion thereof passes through each of the left strap inserting member and the right strap inserting member.

In such an airbag device, when the left half of the occupant comes to contact with the left portion of the expanded airbag before with the right portion, the left portion of the airbag retreats. At that time, the left-right strap is shifted through the strap inserting members toward the right half by means of tension of the right half thereof, and thus the length of the right half of the left-right strap is increased. Consequently, to compensate the retreat of the left portion of airbag, the right portion of airbag is further expanded forward. For this reason, the impact inflicted on the right half of the occupant coming to contact with the right portion of airbag can be effectively absorbed.

DETAILED DESCRIPTION OF PREFERRED EMBODIMENTS

Hereunder, embodiments of the present invention will be explained in detail with reference to the accompanying drawings.

Figure 1:
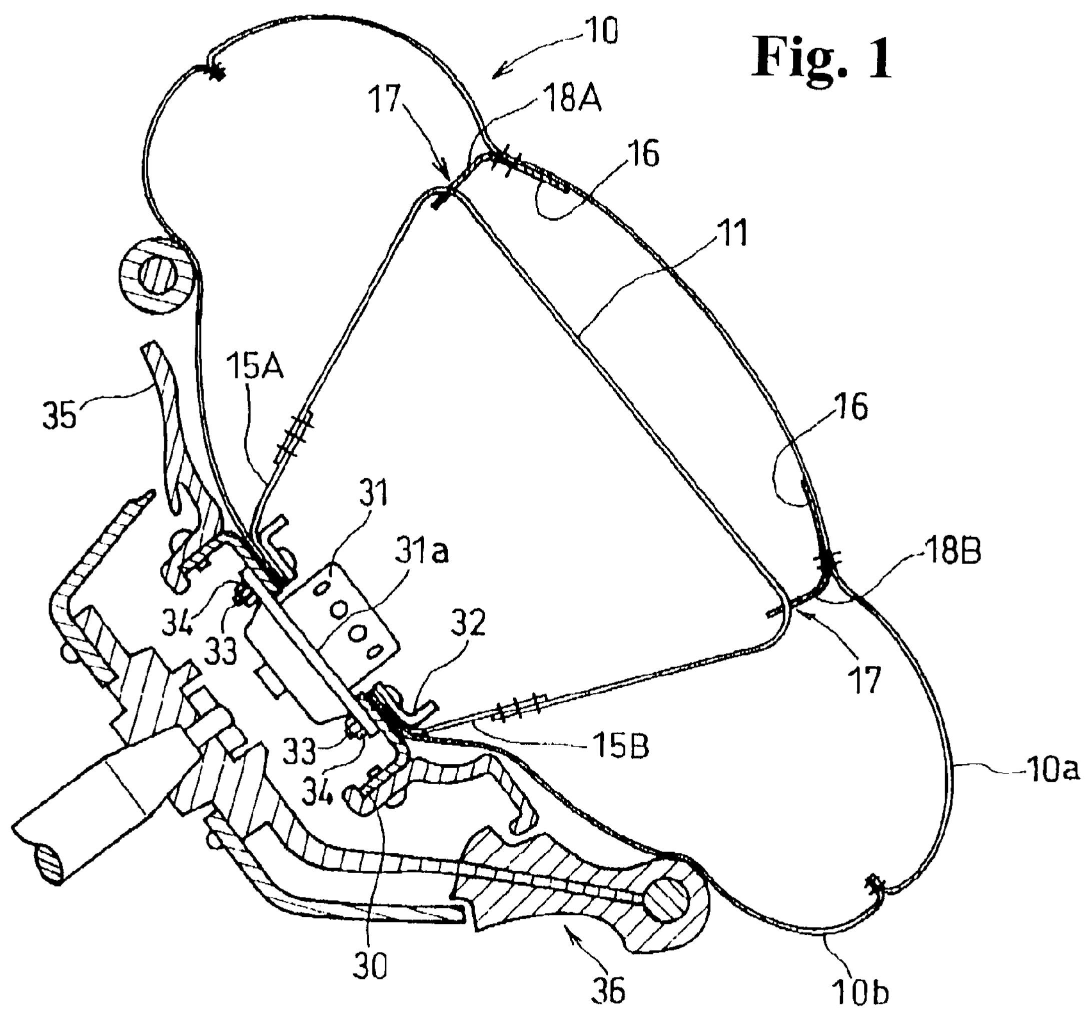
FIG. 1 is a vertical sectional view of an airbag device according to an embodiment of the present invention.
Figure 2:
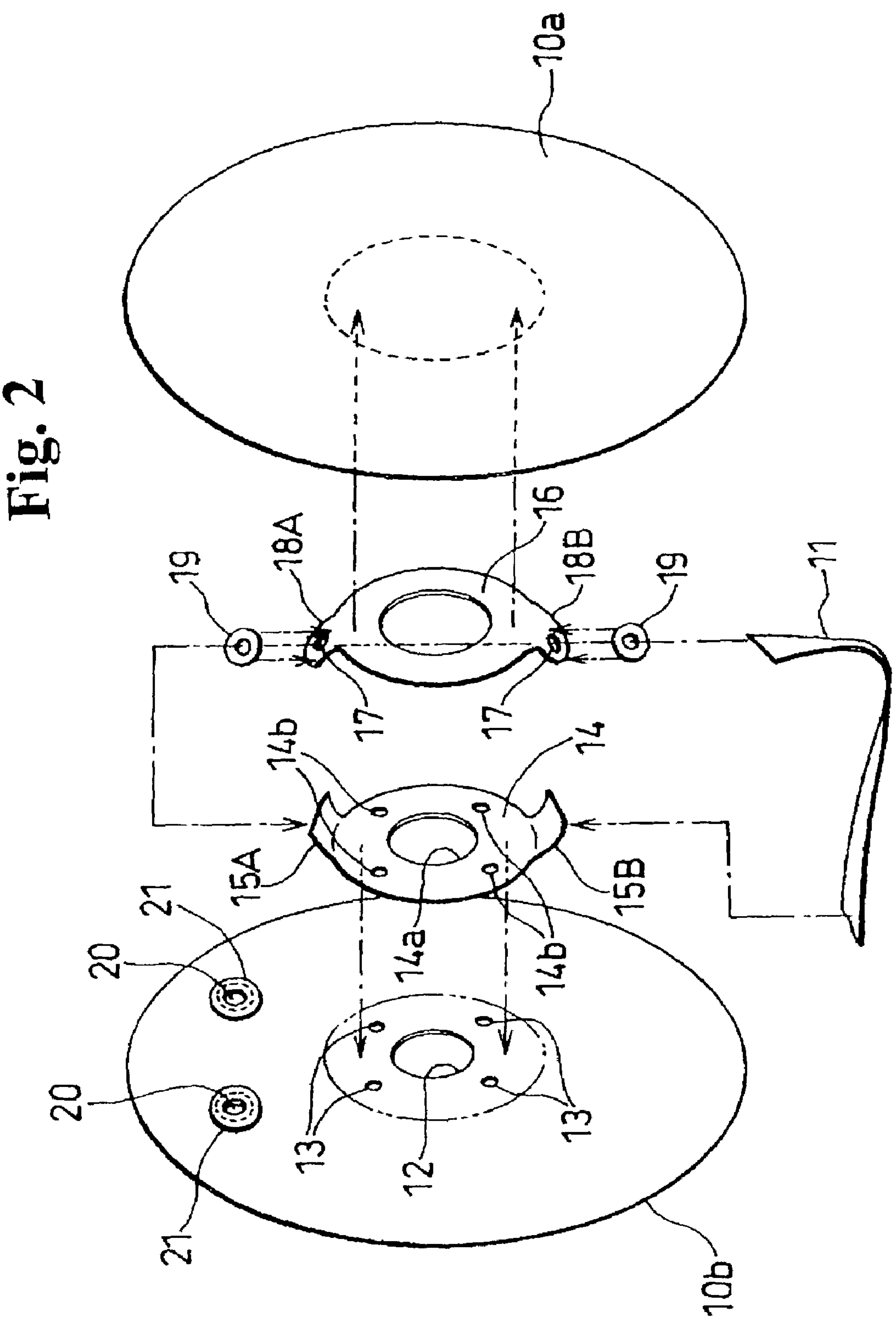
FIG. 2 is an exploded perspective view of an airbag in FIG. 1.
Figure 3:
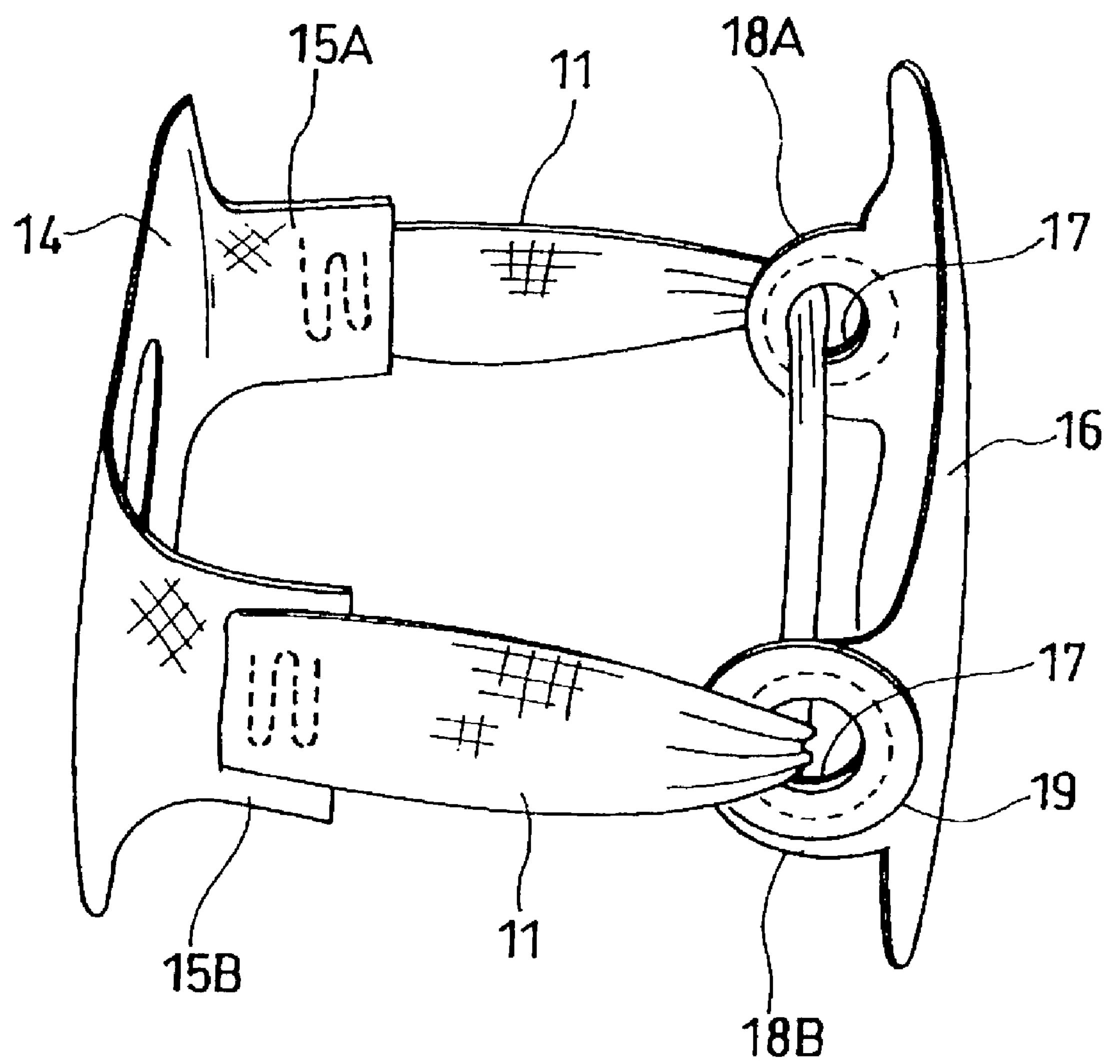
FIG. 3 is an explanatory view illustrating an arrangement of a strap in FIG. 1.

FIG. 1 is a vertical sectional view of an airbag device when an airbag is expanded according to an embodiment of the present invention; FIG. 2 is an exploded perspective view of the airbag; FIG. 3 is an explanatory view illustrating an arrangement of a strap; and FIGS. 4(*a*) and 4(*b*) are explanatory views illustrating an operation state of the airbag device. Further, an up-and-down direction in the following description corresponds to an up-and-down direction when a steering wheel of a vehicle equipped with the airbag device is maintained in a neutral steering state (a state that the wheel is not turned) for steering the vehicle straight ahead.

The airbag device includes an airbag 10 for a driver seat. The airbag 10 is constructed by sewing circumferential edge portions of a front panel 10*a* and a rear panel 10*b* made of a circular fabric and the like, respectively, and to be expanded upon introducing a gas between both panels. In the airbag 10, a strap 11 is provided for connecting the front panel 10*a* and the rear panel 10*b*.

The airbag 10 is constructed such that when the device is installed in a vehicle, the front panel 10*a* faces an occupant and the rear panel 10*b* is connected to a retainer 30 on the opposite side. An opening 12 for attaching an inflator 31 is provided in the vicinity of a center of the rear panel 10*b*. The airbag 10 is expanded upon introducing the gas from the inflator 31 through the opening 12. A circumferential edge portion of the opening 12 in the rear panel 10*b* is provided with inserting holes 13 for inserting bolts for fixing the airbag 10 to the retainer 30. The inserting holes 13 are arranged around the opening 12 with an equal interval.

The circumferential edge portion of the opening 12 in the rear panel 10*b* is provided with a reinforcing cloth 14 along an inner surface of the rear panel 10*b*. The reinforcing cloth 14 has an annular shape with an opening 14*a* having a diameter almost equal to that of the opening 12. The opening 14*a* is arranged almost coaxially with the opening 12, and the reinforcing cloth 14 is fixed to the rear panel 10*b* by sewing. Further, a circumferential edge portion of the opening 14*a* in the reinforcing cloth 14 is provided with inserting holes 14*b* having diameters almost equal to those of the inserting holes 13 at positions overlapping the inserting holes 13.

As shown in FIG. 2, an upper edge and a lower edge of the reinforcing cloth 14 are provided with ear portions 15A and 15B for connecting both ends of the strap 11, respectively. The ear portions 15A and 15B are arranged in the vicinity of centers in the left-and-right direction of the upper and lower portions of the rear panel 10*b*.

A reinforcing cloth 16 is provided in the vicinity of a center of the front panel along an inner surface thereof. As shown in FIG. 2, the reinforcing cloth 16 has an annular shape in which an upper edge and a lower edge thereof are overlapped with the upper portion and the lower portion of the front panel 10*a*, respectively. Further, the reinforcing cloth 16 is arranged almost concentrically with the front panel 10*a* and is fixed to the front panel 10*a* by sewing and the like.

The upper edge and the lower edge of the reinforcing cloth 16 are provided with strap inserting members 18A and 18B having an opening 17, respectively, for allowing the strap 11 to pass therethrough. The strap inserting members 18A and 18B are arranged in the vicinity of a center in the left-and-right direction of the upper portion and the lower portion of the front panel 10*a*, respectively. Annular reinforcing cloths 19 for reinforcing the openings 17 are fixed to circumferential edge portions of the openings 17 of the respective strap inserting members 18A and 18B, respectively, by sewing and the like.

As shown in FIG. 3, both ends of the strap 11 are connected to the respective ear portions 15A and 15B of the reinforcing cloth 15 of the rear panel 10*b*, respectively, by sewing and the like. An intermediate portion of the strap passes through the openings 17 of the strap inserting members 18A and 18B, respectively, arranged in the upper portion and the lower portion of the front panel 10*a*. The intermediate portion of the strap 11 is movable in the longitudinal direction thereof through the respective openings 17.

The upper portion and the lower portion of the front panel 10*a* are connected to the rear panel 10*b*, respectively, by the strap 11 arranged as above.

As shown in FIG. 2, the left side and the right side of the upper portion of the rear panel 10*b* are provided with vent holes 20 to avoid the strap 11 passing through the vicinity of the center in the left-and-right direction in the airbag 10. In this embodiment, the vent holes 20 are circular openings. An annular reinforcing cloth 21 is attached to a circumferential edge portion of each vent hole 20 by sewing and the like, concentrically with the vent hole 20. FIG. 2 shows an example of an arrangement of the vent holes. However, a shape or number of the vent holes, an arranging position and a reinforcing structure of the circumferential edge portion thereof are not limited to the example.

The airbag 10, as shown in FIG. 1, is connected to a front surface (a surface facing an occupant) of the retainer 30 by means of a holding ring 32. Stud bolts 33 are projected from a rear surface of the holding ring 32 at the same intervals as the inserting holes 13 of the rear panel 10*b*.

The inflator 31 is fitted into the retainer 30. A flange 31*a* projects laterally from the inflator 31, and overlaps with the rear surface of the retainer 30.

In the airbag 10, the circumferential edge portion of the opening 12 of the rear panel 10*b* is overlapped with the front surface of the retainer 30 such that the inflator is attached to the opening 12. The holding ring 32 is overlapped with the circumferential edge portion of the opening 12 concentrically with the opening 12. The stud bolts 33 are inserted into the inserting holes 13 and pass through the retainer 30 and the flange 31*a*. Further, by fastening the front ends of the stud bolts 33 with nuts 34, the holding ring 32 is fixed to the retainer 30, and the circumferential edge portion of the opening 12 is sandwiched between the holding ring 32 and the retainer 30. Further, the flange 31*a* of the inflator 31 is also fixed to the retainer 30 along with the holding ring 32 by means of the stud bolts 33 and the nuts 34.

The airbag device is constructed such that the airbag 10 is folded and covered with a cover 35 (see FIG. 1). The airbag device is installed in a steering wheel 36 of a vehicle.

Figure 4B:
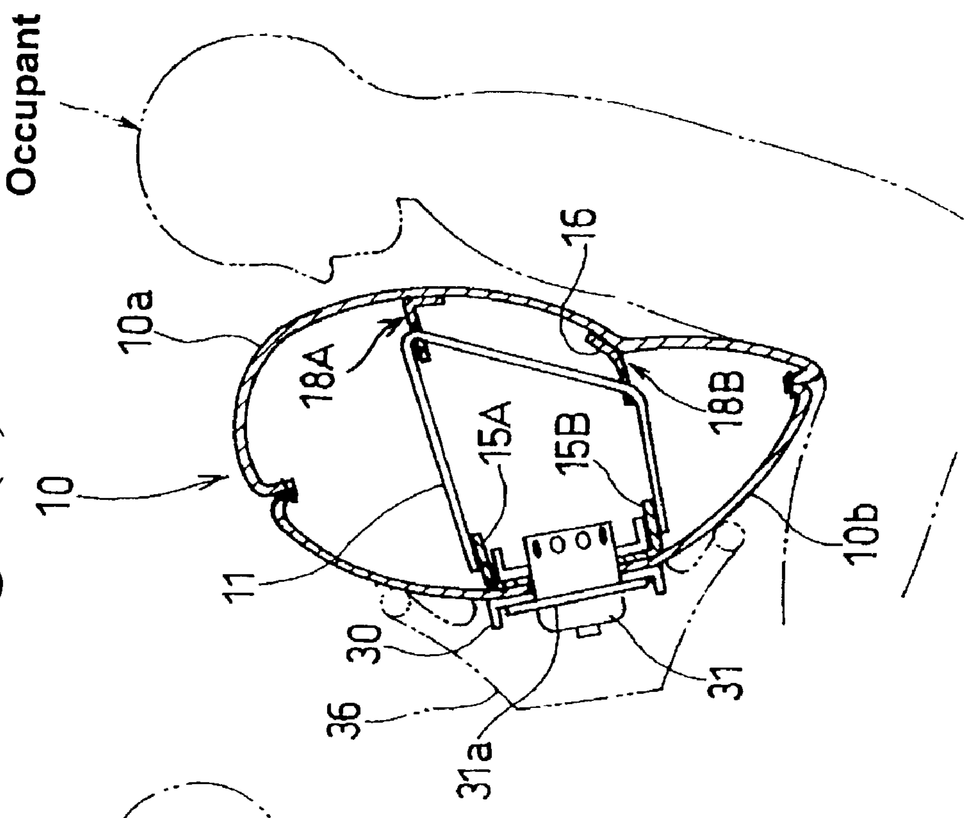
FIGS. 4(*a*) and 4(*b*) are explanatory views illustrating an operation of the airbag device in FIG. 1.
Figure 4A:
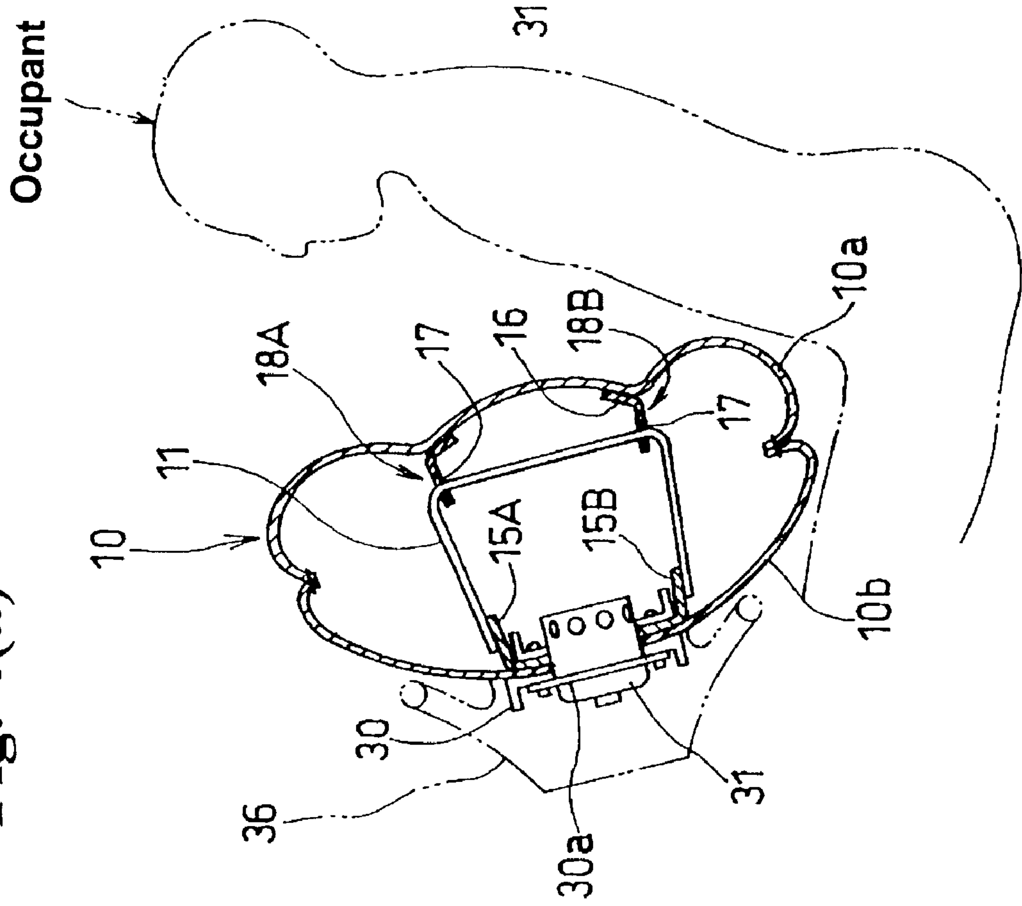

Now, an operation state of the airbag device will be explained with reference to FIGS. 4(*a*) and 4(*b*). FIG. 4(*a*) is a sectional view of the airbag device when the airbag is completely expanded, and FIG. 4(*b*) is a sectional view of the airbag when the airbag contacts an occupant.

In the airbag device installed in the steering wheel 36 of the vehicle, in case of an emergency such as a vehicle collision, the inflator 31 ejects and supplies the gas to the inside of the airbag 10, thereby expanding the airbag 10. The airbag 10 pushes and opens the cover 35 by means of the gas pressure to deploy inside the vehicle.

At that time, since the upper portion and the lower portion of the front panel 10*a* are connected to the rear panel 10*b* by means of the strap 11, the forward expansion of the airbag 10 is restricted and the inner volume thereof is kept small. For this reason, even when the inflator 31 has a low output, the airbag 10 rapidly completes the expansion process to reach a state that it can receive the occupant (see FIG. 4(*a*)).

When the occupant comes to contact with the expanded airbag 10, the lower portion of the body such as abdomen first comes to contact with the lower portion of the front panel 10*a* facing thereto. Then, the lower portion of the front panel 10*a* receives the lower portion of the occupant and retreats toward the rear panel 10*b* while absorbing the kinetic energy of the occupant.

At that time, the lower half of the strap 11 drawn through the strap inserting member 18B from the ear portion 15B for restricting the forward expansion of the lower portion of the front panel 10*a* becomes loose as the lower portion of the front panel 10*a* retreats. Then, the lower half of the strap 11 is shifted by the loose portion toward the upper half through the strap inserting members 18B, 18A by means of tension from the upper half of the strap 11 drawn through the strap inserting member 18A from the ear portion 15A for restricting the forward expansion of the upper portion of the front panel 10*a*, thereby increasing the length of the upper half of the strap 11. For this reason, the restriction on the upper portion of the front panel 10*a* by means of the upper half of the strap 11 is relieved, and thus as shown in FIG. 4 (*b*), the upper portion of the front panel 10*a* is further expanded forwardly.

Since the further expanded upper portion of the airbag 10 receives the head portion of the occupant coming to contact with the upper portion of the airbag 10, it is possible to effectively absorb the impact inflicted on the head portion of the occupant.

Figure 5:
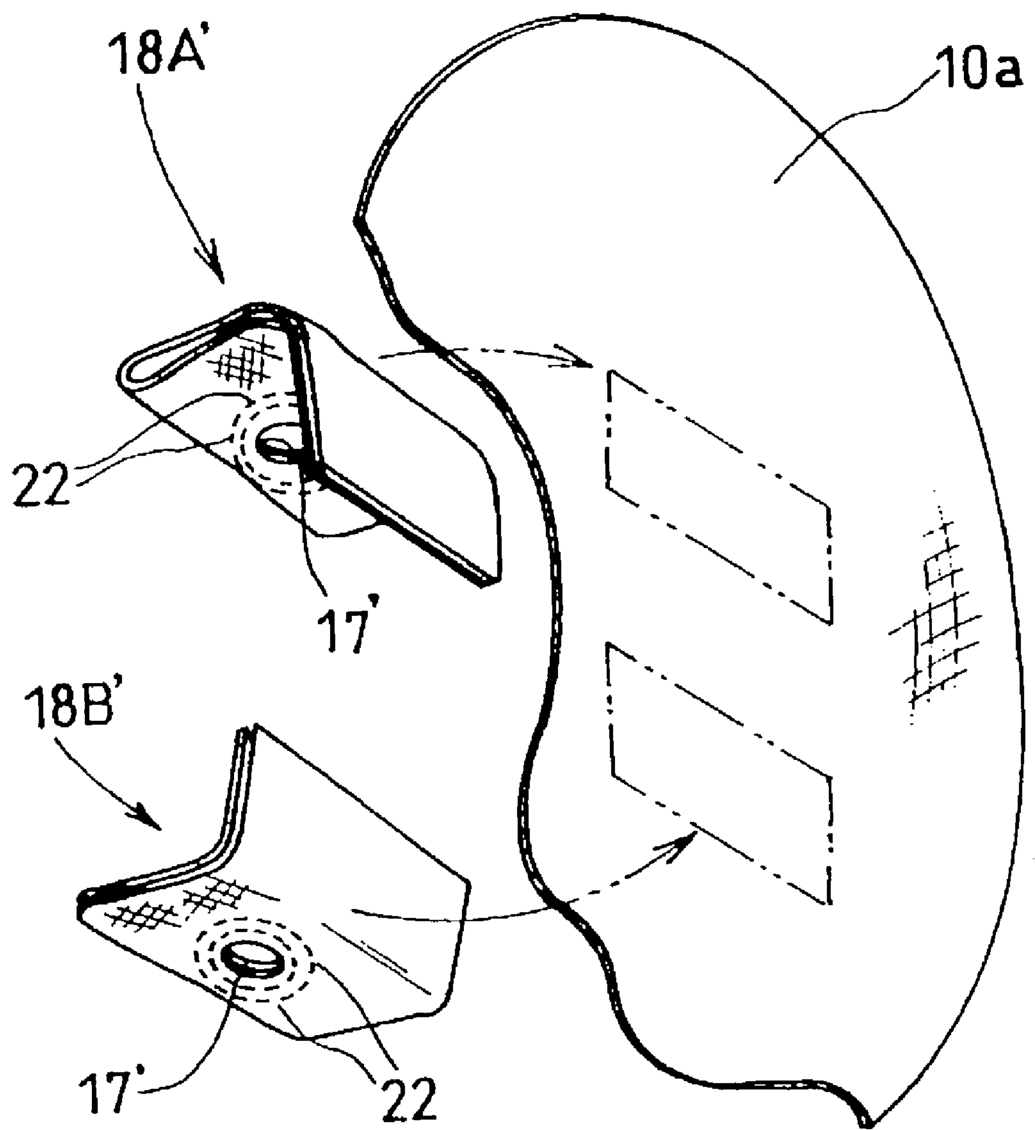
FIG. 5 is an exploded perspective view illustrating strap inserting members according to an embodiment.

In the above embodiment, the strap inserting members 18A, 18B are constructed in an ear shape and integrated with the reinforcing cloth 16 at the upper edge and the lower edge of the reinforcing cloth 16 attached to the inner surface of the front panel 10*a*. However, the strap inserting members are not limited to such configuration. For example, both strap inserting members may be provided separately from the reinforcing fabric. Further, each strap inserting member may be separately provided in the upper portion and the lower portion of the front panel 10*a*. FIG. 5 is an exploded perspective view illustrating main parts of the strap inserting members provided separately as mentioned above.

In an embodiment shown in FIG. 5, an upper strap inserting member 18A' and a lower strap inserting member 18B' are constructed separately, and each member is arranged in the upper portion and the lower portion of the front panel 10*a*.

Each of the strap inserting members 18A' and 18B' is fabricated from a belt-like basic cloth. The basic cloth is fold back from the center in the longitudinal direction thereof and thus is constructed in a two sheets-overlapped state. An opening 17' perforated in the basic cloth of the two sheets-overlapped shape is provided on the front end side of each of the strap inserting members 18A' and 18B'. A strap (not shown) is drawn through the opening 17'. The overlapped cloths are sewn along the circumferential edge portion of the opening 17', and as a result, the circumferential edge portion of the opening 17' is reinforced. A reference numeral 22 in FIG. 5 indicates the sewn line. The base sides of the respective strap inserting members 18A' and 18B' are coupled to the inner surface of the front panel 10*a* by sewing and the like, respectively.

Each strap inserting member may have various shapes other than the aforementioned shape. For example, a ring or a loop-shaped member made of a cloth, metal, synthetic resin and the like may be attached to the front panel 10*a* through the base cloth such as the reinforcing cloth 16 or directly attached to the front panel 10*a*, and then the strap may be drawn through it.

Figure 6:
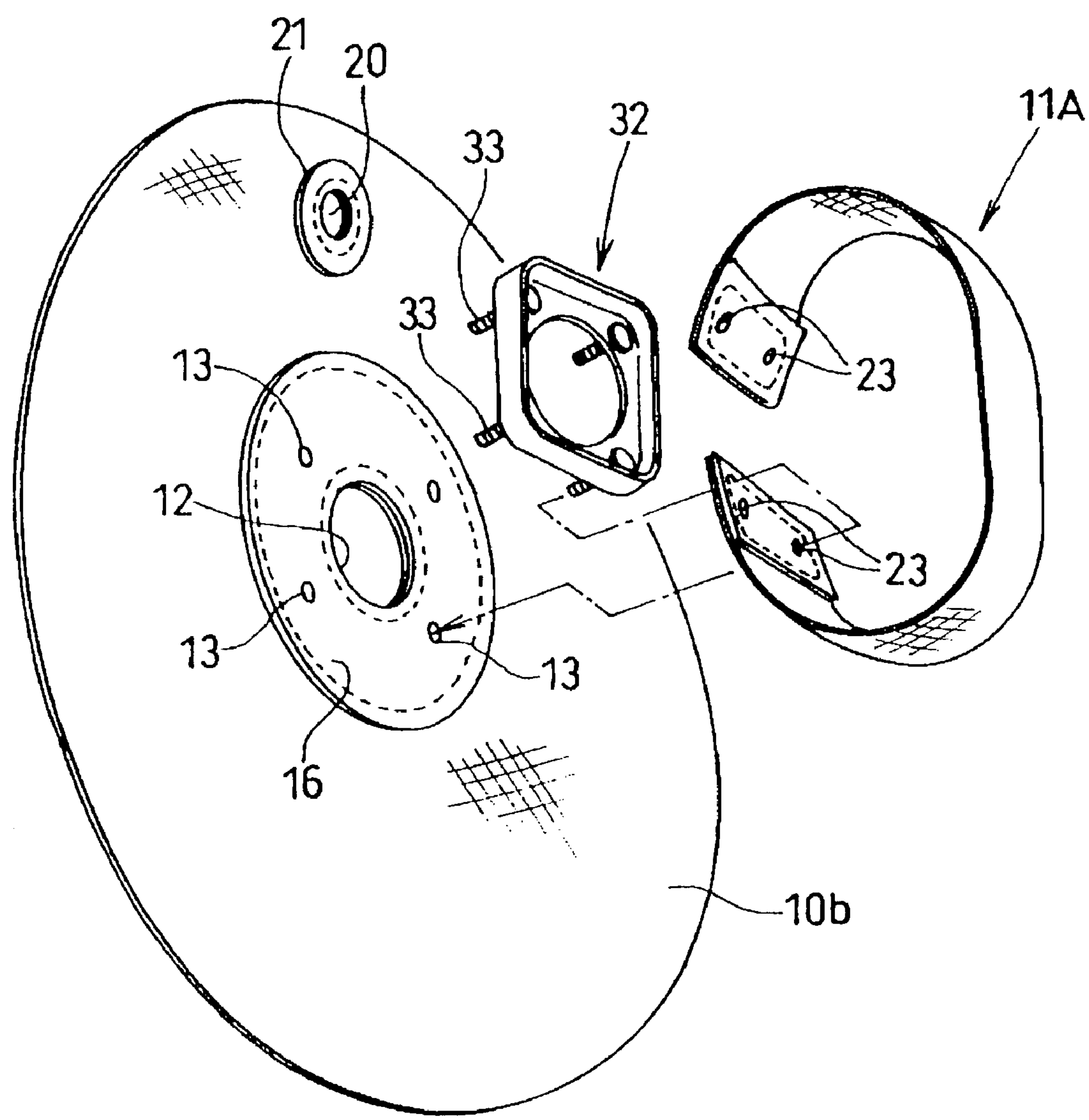
FIG. 6 is an exploded perspective view illustrating a strap connecting structure according to an embodiment.

The structure for connecting both ends of the strap 11 to the rear panel 10*b* may include various structures other than that shown in FIGS. 1 to 4(*b*). For example, both ends of the strap 11 may be placed between the rear panel 10*b* and the reinforcing cloth 14, and may be sewn on the rear panel 10*b* along with the circumferential edge portion of the reinforcing cloth 14. Alternatively, both ends of the strap 11 may not be connected to the rear panel 10*b*, instead may be sandwiched between the holding ring 23 and the retainer 30 along with the circumferential edge portion of the opening 12 of the rear panel 10*b* for attaching the inflator. FIG. 6 is an exploded perspective view illustrating such a connection structure of the strap.

In the embodiment of FIG. 6, a total of four bolt inserting holes 13 are provided around the opening 12 of the rear panel 10*b* to pass through the reinforcing cloth 14 for attaching the inflator. Each of the inserting holes 13 is arranged with an equal interval at positions whose phases are shifted by about 45° from a left-and-right line and an up-and-down line passing through a center of the opening 12. Four stud bolts 33 project from the rear surface of the holding ring 32 with the same interval as that of the inserting holes 13.

An upper end portion of a strap 11A has two inserting holes 23 overlapping the respective inserting holes 13 arranged in the upper-right side and the upper-left side of the opening 12. A lower end portion of the strap 11A has two inserting holes 23 overlapping the respective inserting holes 13 arranged in the lower-right side and the lower-left side of the opening 12. The inserting holes 23 adjacent to each other are arranged along the upper end edge and the rear end edge of the strap 11A, respectively.

Further, the strap 11A is formed of a belt-like basic cloth longer than a necessary length, and both ends thereof are fold back to be in a two sheets-overlapped state, so that the both ends thereof are reinforced. The respective inserting holes 23 pass through the two sheets-overlapped base cloths.

An intermediate portion of the strap 11A passes through the respective strap inserting holes 18A and 18B (or 18A' and 18B', not shown) arranged in the upper portion and the lower portion of the front panel 10*a* (not shown). Both ends thereof are not attached to the rear panel 10*b*.

In the connection structure of the strap 11A, the circumferential edge portion of the opening 12 of the rear panel 10*b* is overlapped with the front surface of the retainer 30 (not shown). Also, the upper end portion and the lower end portion of the strap 11A are overlapped with the upper edge side and the lower edge side of the opening 12, respectively. Further, the holding ring 32 is overlapped thereon. At that time, the corresponding inserting holes 13, 23 are overlapped with each other, and the stud bolts 33 are inserted. The front ends of the stud bolts 33 pass through the retainer 30. Then, the front ends of the stud bolts 33 are fastened with the nuts 34 (not shown), and the holding ring 32 is fixed to the retainer 30. Accordingly, the circumferential edge portion of the opening 12 and the both ends of the strap 11A are sandwiched between the holding ring 32 and the retainer 30.

In this embodiment, one vent hole 20 is provided substantially right above the opening 12. To a circumferential edge portion of the vent hole 20, an annular reinforcing cloth 21 is attached concentrically with the vent hole.

Figure 7A:
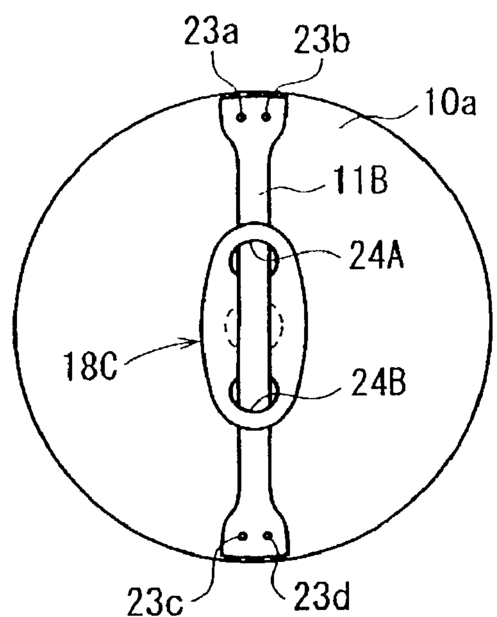
FIGS. 7(*a*) and 7(*b*) are explanatory views illustrating an arrangement of a strap according to an embodiment.
Figure 7B:
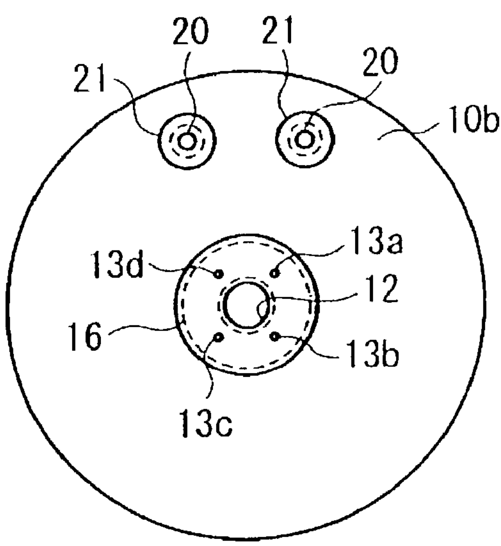

In the respective embodiments as described above, the upper portion and the lower portion of the front panel of the airbag are connected to the rear panel of the airbag by only one strap to control the forward expansion of the upper portion and the lower portion of the front panel when the airbag is expanded. However, in the airbag device according to the present invention, the number of the straps or an arrangement thereof may be changed according to its use or application conditions. FIGS. 7(*a*), 7(*b*) to 10(*a*), 10(*b*) show various embodiments having a different number or a different arrangement of the straps. FIGS. 7(*a*), 8(*a*), 9(*a*) and 10(*a*) are plan views showing the inner sides of front panels unfolded to be flat. FIGS. 7(*b*), 8(*b*), 9(*b*) and 10(*b*) are plan views showing the inner sides of rear panels to be combined with the front panels shown in FIGS. 7(*a*), 8(*a*), 9(*a*) and 10(*a*).

In an embodiment shown in FIGS. 7(*a*), 7(*b*), one strap 11B extending in the up-and-down direction is provided at the vicinity of a center of a front panel 10*a*. A strap inserting member 18C is provided in the vicinity of the center of the front panel 10*a*.

The strap inserting member 18C is formed of a base cloth having a rectangular shape elongated in the up-and-down direction. The upper end side and the lower end side thereof are provided with openings 24A, 24B for allowing the strap 11B to pass therethrough. The openings 24A, 24B of the strap inserting member 18C are arranged in the upper portion and the lower portion of the front panel 10*a*, respectively. A center vicinity thereof in the longitudinal direction is coupled to the front panel 10*a* by sewing and the like.

Figure 8A:
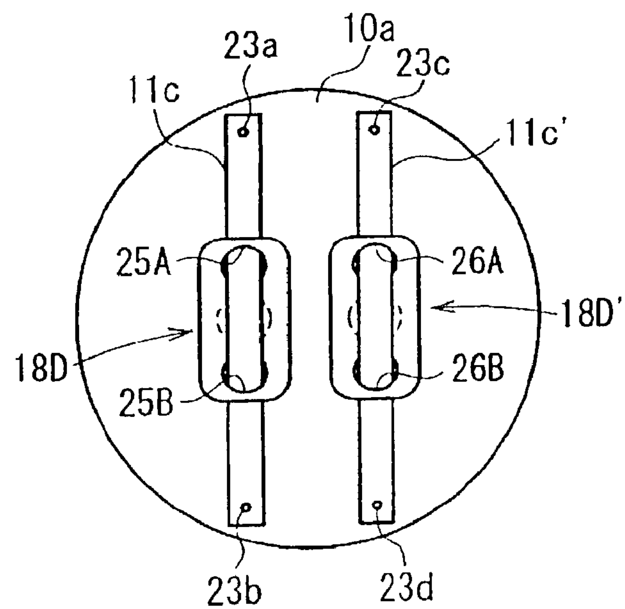
FIGS. 8(*a*) and 8(*b*) are explanatory views illustrating an arrangement of a strap according to an embodiment.
Figure 8B:
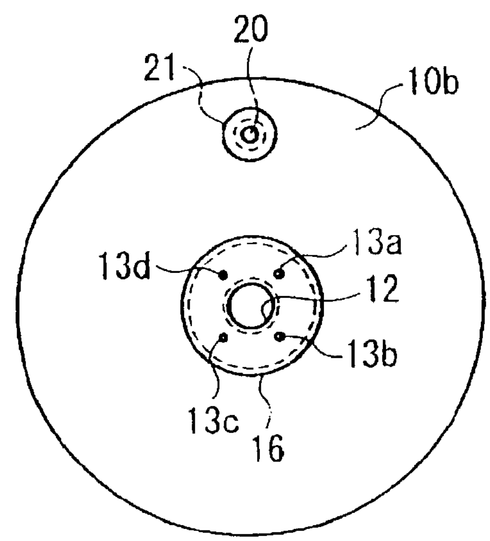

In an embodiment shown in FIGS. 8(*a*), 8(*b*), two straps 11C and 11C' extending parallel in the up-and-down direction are provided. The two straps sandwich a center area of the front panel 10*a* in the left-and-right direction, and are situated at positions different from each other in the left-and-right direction. Two strap inserting members 18D and 18D' sandwiching the center area of the front panel 10*a* in the left-and-right direction at positions different from each other in the left-and-right direction are provided in the vicinity of the center area of the front panel 10*a*.

The strap inserting members 18D and 18D' have a structure similar to that of the strap inserting members 18C in FIG. 7(*a*), respectively, in which the two strap inserting members 18C are arranged parallel in the vertical direction. The strap inserting members 18D and 18D' have openings 25A, 26A and 25B, 26B for allowing the straps 11C and 11C' to pass therethrough at the upper end side and the lower end side thereof, respectively. The openings 25A and 26A at the upper end side are arranged in the upper portion of the front panel 10*a*, and the openings 25B and 26B at the lower end side are arranged in the lower portion of the front panel 10*a*, respectively. Further, the central portions in the up-and-down direction of the respective strap inserting members 18D and 18D' are coupled to the inner surface of the front panel 10*a* by sewing and the like.

The strap 11C is drawn through the openings 25A and 25B of the strap inserting member 18D, and the strap 11C' is drawn through the openings 26A and 26B of the strap inserting member 18D'.

Figure 9A:
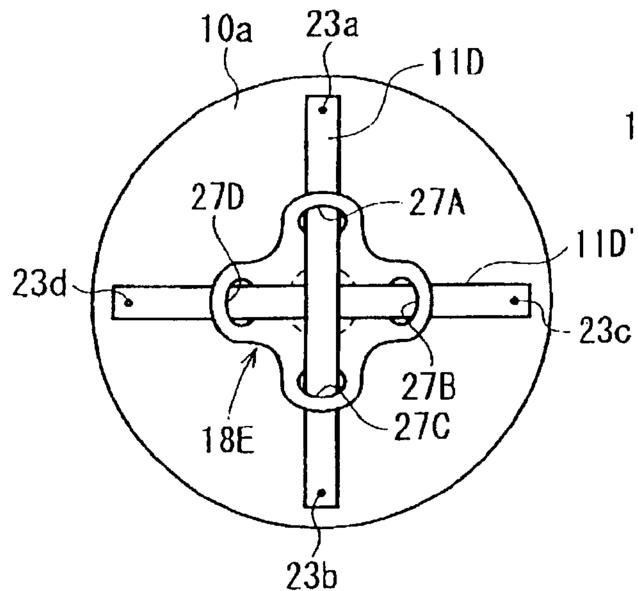
FIGS. 9(*a*) and 9(*b*) are explanatory views illustrating an arrangement of a strap according to an embodiment.
Figure 9B:
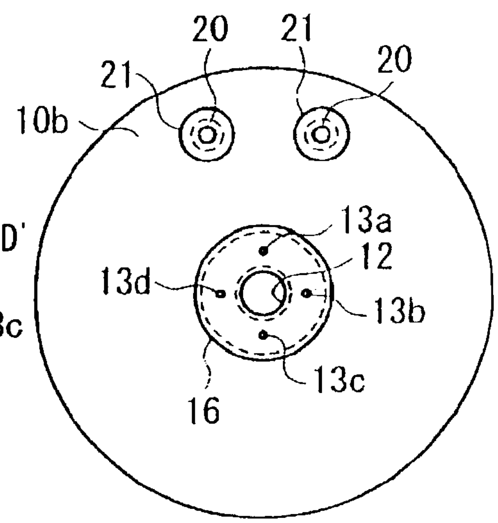

In another embodiment shown in FIGS. 9(*a*) and 9(*b*), straps 11D and 11D' are provided in the up-and-down direction and the left-and-right direction in the front panel 10*a*, respectively. The straps 11D and 11D' cross each other in the vicinity of a center of the front panel 10*a*. The center of the front panel 10*a* is provided with a strap inserting member 18E for both straps 11D and 11D'.

The strap inserting member 18E is formed of a base cloth having a square shape, and openings 27A, 27B, 27C and 27D are provided in the vicinity of each vertex thereof. The vertexes of the strap inserting member 18E are arranged to be directed toward the up-and-down direction and the left-and-right direction, respectively. The openings 27A and 27C are arranged in the upper portion and the lower portion of the front panel 10*a*, respectively. The openings 27B and 27D are arranged in the left portion and the right portion of the front panel 10*a*, respectively. Further, a central portion of the strap inserting member 18E is attached to the inner surface of the front panel 10*a* by sewing and the like.

The strap 11D is drawn through the upper and lower openings 27A and 27C of the strap inserting member 18E, and the strap 11D' is drawn through the left and right openings 27B and 27D.

Figure 10A:
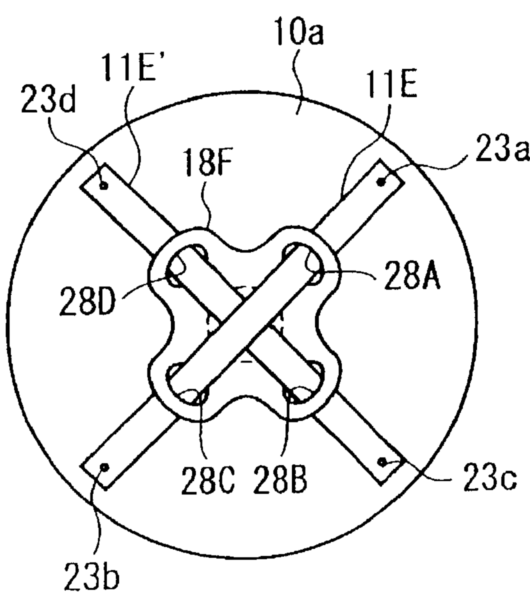
FIGS. 10(*a*) and 10(*b*) are explanatory views illustrating an arrangement of a strap according to an embodiment.
Figure 10B:
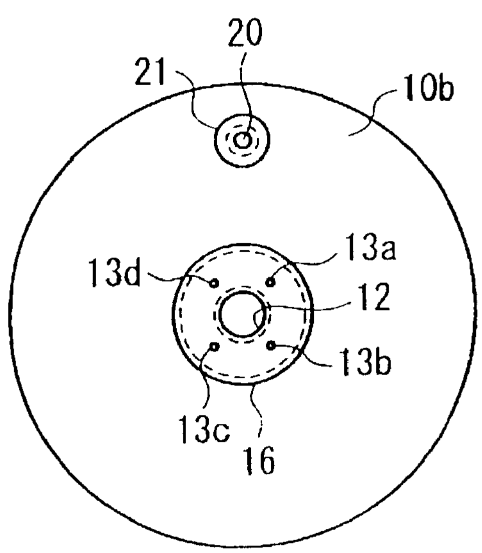

An embodiment shown in FIGS. 10(*a*) and 10(*b*) has an arrangement obtained by rotating the front panel 10*a* in FIGS. 9(*a*) and 9(*b*) clockwise by about 45°.

In the embodiment shown in FIGS. 10(*a*) and 10(*b*), two straps 11E and 11E' are provided and extend in a substantially X shape from the upper-left side to the lower-right side and from the lower-left side to the upper-right side of the front panel 10*a*. The straps 11E and 11E' cross each other in the vicinity of the center of the front panel 10*a*. A central portion of the front panel 10*a* is provided with a strap inserting member 18F having a square shape, four vertexes of which are directed toward the upper-left side, the lower-left side, the lower-right side and the upper-right side, respectively. Openings 28A, 28B, 28C and 28D are provided in the vicinity of each vertex of the strap inserting member 18F.

The openings 28A, 28B, 28C and 28D are arranged at the upper-left portion, the lower-left portion, the lower-right portion and the upper-right portion of the front panel 10*a*, respectively. The strap 11E is drawn through the openings 28A and 28C, and the strap 11E' is drawn through the openings 28B and 28D.

In the respective embodiments shown in FIGS. 7(*a*), 7(*b*) to 10(*a*), 10(*b*), vent holes are provided in the rear panel 10*b* at locations other than the extended areas of the respective straps 11B, 11C, 11C', 11D, 11D', 11E and 11E', respectively. A reinforcing cloth 21 is provided in each vent hole 20 for reinforcing the circumferential edge portion thereof, respectively.

The connection structure of the strap in each embodiment in FIGS. 7(*a*), 7(*b*) to 10(*a*), 10(*b*) is constructed such that the circumferential edge portion of the opening 12 of the rear panel 10*b* and both ends of each strap 11B to 11E' are sandwiched between the holding ring 32 (not shown) and the retainer 30 (not shown), similarly to the connection structure of the strap in FIG. 6. that is, both ends of each strap 11B to 11E' in FIGS. 7(*a*), 7(*b*) to 10(*a*), 10(*b*) are provide with bolt inserting holes 23 (23*a* to 23*d*) overlapping the respective bolt inserting holes 13 (13*a* to 13*d*) arranged around the opening 12.

Specifically, in the embodiment in FIGS. 7(*a*) and 7(*b*), the inserting holes 13*a*, 13*b*, 13*c* and 13*d* are provided in the rear panel 10*b* around a circle at every 90°, shifted by 45° from the lines passing through the center of the opening 12 in the up-and-down direction and the left-and-right direction. The upper end portion of the strap 11B is provided with two inserting holes 23*a* and 23*b* overlapping the respective inserting holes 13*a* and 13*d* arranged at the upper-right side and the upper-left side of the opening 12. The lower end portion of the strap is provided with two inserting holes 23*c*, 23*d* overlapping the respective inserting holes 13*b* and 13*c* arranged at the lower-right side and the lower-left side of the opening 12.

In the embodiment in FIGS. 8(*a*) and 8(*b*), the openings 13*a*, 13*b*, 13*c* and 13*d* are provided on the upper-right side, the lower-right side, the lower-left side and the upper-left side of the opening 12 of the rear panel 10*b*, respectively, similar to the embodiment in FIGS. 7(*a*), 7(*b*). Both ends of the strap 11C are provided with the inserting hole 23*a* overlapping the upper-right inserting hole 13*a* of the opening 12 and the inserting hole 23*b* overlapping the lower-right inserting hole 13*b* of the opening 12, respectively. Further, both ends of the strap 11C' are provided with the inserting hole 23*c* overlapping the upper-left inserting hole 13*d* of the opening 12 and the inserting hole 23*d* overlapping the lower-left inserting hole 13*c* of the opening 12, respectively.

In the embodiment in FIGS. 9(*a*) and 9(*b*), the inserting holes 13*a*, 13*b*, 13*c* and 13*d* are provided in the upper, right, lower and left sides of the opening 12 of the rear panel 10*b* in a circle at every 90°. Both ends of the strap 11D are provided with the inserting hole 23*a* overlapping the upper inserting hole 13*a* of the opening 12 and the inserting hole 23*b* overlapping the lower inserting hole 13*c* of the opening 12, respectively. Further, both ends of the strap 11D' are provided with the inserting hole 23*d* overlapping the right inserting hole 13*b* of the opening 12 and the inserting hole 23*c* overlapping the left inserting hole 13*d* of the opening 12, respectively.

In the embodiment in FIGS. 10(*a*) and 10(*b*), the openings 13*a*, 13*b*, 13*c* and 13*d* are provided at the upper-right side, the lower-right side, the lower-left side and the upper-left side of the opening 12 of the rear panel 10*b*, respectively, similar to the embodiments of FIGS. 7(*a*), 7(*b*) and 8(*a*), 8(*b*). Both ends of the strap 11E' are provided with the inserting hole 23*d* overlapping the upper-right inserting hole 13*a* of the opening 12 and the inserting hole 23*c* overlapping the lower-left inserting hole 13*c* of the opening 12, respectively. Further, both ends of the strap 11E are provided with the inserting hole 23*a* overlapping the upper-left inserting hole 13*d* of the opening 12 and the inserting hole 23*b* overlapping the lower-right inserting hole 13*b* of the opening 12, respectively.

In each strap 11B to 11E' in FIGS. 7(*a*) to 10(*a*), both ends thereof are overlapped with the circumferential edge portion of the opening 12 of the rear panel 10*b* such that the inserting holes 23*a* to 23*d* overlap the corresponding inserting holes 13*a* to 13*d*, and are sandwiched between the holding ring 32 and the retainer 30 along with the circumferential edge portion thereof. The stud bolts 33 are inserted into the respective inserting holes 23*a* to 23*d* and 13*a* to 13*d* corresponding to each other.

In FIGS. 7(*a*), 7(*b*) to 10(*a*), 10(*b*), the airbag is constructed by overlapping the front panel 10*a* and the rear panel 10*b* and connecting the circumferential edge portions thereof. Then, the rear panel 10*b* is connected to the retainer 30 along with the inflator 31 by using the holding ring 32. The airbag is folded and covered with the cover 35 (not shown), thereby completing the airbag device. The airbag device is installed in the steering wheel 36 (not shown).

The airbag in FIGS. 7(*a*) and 7(*b*) has the configuration basically similar to the airbags 10 in FIGS. 1 to 4, and has effects similar to those thereof.

In the airbag device including the airbag having the configuration in FIGS. 8(*a*) and 8(*b*), the forward expansion of the front panel 10*a* is restricted by the straps 11C and 11C' when the airbag is expanded. Thus, even when the inner volume of the airbag is small and the inflator 31 has a low output, the airbag can be deployed completely in a short time.

The upper portion and the lower portion of the expanded airbag are connected by the straps 11C and 11C' at the left half side and the right half side thereof. Therefore, in addition to the effects similar to those of the airbag 10 in FIGS. 1 to 4(*a*), 4 (*b*), even when the occupant encounters a collision partially with the left half side or the right half side of the airbag, the upper portion is expanded forwardly along with the movement of the strap 11C or 11C'. Accordingly, the left half side or the right half side can effectively adsorb the impact inflicted on the head portion when the upper portion receives the head portion of the occupant contacting with the upper portion.

In the airbag having the configuration in FIGS. 9(*a*) and 9(*b*), the upper portion and the lower portion of the front panel 10*a* are connected to the rear panel 10*b* by means of the strap 11D, and the right portion and the left portion of the front panel 10*a* are connected to the rear panel 10*b* by means of the strap 11D'. In the airbag device with this airbag, since the forward expansion of the front panel 10*a* is restricted by the straps 11D and 11D' when the airbag is expanded, even when the inner volume of the airbag is small and the inflator 31 has low-power, the unfolding of the airbag can be completed very rapidly.

In a case that the steering wheel 36 is in the neutral steering state when the airbag is expanded, the lower portion and the upper portion of the front panel 10*a* are arranged on the upper side and the lower side of the airbag, respectively. When the abdominal vicinity of the occupant comes to contact with the lower side of the airbag, the lower portion of the front panel 10*a* retreats and the upper portion of the front panel 10*a* further expands forwardly along with the movement of the strap 11D. Therefore, it is possible to effectively absorb the impact inflicted on the head portion when the airbag receives the head portion coming to contact with the upper portion thereof.

In a case that the steering wheel 36 is turned by 90° toward the right side (or the left side) when the airbag is expanded, the right portion (or the left portion) of the front panel 10*a* is shifted to the lower side of the airbag. In this state, when the abdominal vicinity of the occupant comes to contact with the lower side of the airbag, the right portion of the front panel 10*a* retreats and the left portion of the front panel 10*a* further expands forwardly along with the movement of the strap 11D' such that the airbag receives the head portion of the occupant coming to contact with the upper portion thereof, thereby effectively absorbing the impact inflicted on the head portion.

Further, in a case that the steering wheel 36 is turned by an angle less than 90° (for example, 45°) toward the right side when the airbag is expanded, one end of each of the straps 11D and 11D' is disposed on the lower side of the airbag and the other end thereof is disposed on the upper side of the airbag. In this state, when the abdominal vicinity of the occupant comes to contact with the lower side of the airbag, the lower portion of the front panel 10*a* retreats and thus the these ends of the straps 11D and 11D' become loose. Then, the lengths of the other ends of the straps 11D and 11D' are increased by the loose portions. The upper portion of the front panel 10*a* is further expanded forwardly such that the airbag receives the head portion of the occupant coming to contact with the upper portion thereof, thereby effectively absorbing the impact inflicted on the head portion.

As described above, in the airbag device including the airbag having the configuration in FIGS. 9(*a*) and 9(*b*), regardless of the turning angle of the steering wheel 36, it is always possible to effectively absorb the impact inflicted on the head portion of the occupant.

The airbag having the configuration in FIGS. 10(*a*) and 10(*b*) is constructed by rotating the airbag in FIGS. 9(*a*) and 9(*b*) clockwise by 45°. Therefore, in the airbag device having this airbag, similar to the airbag device including the airbag in FIGS. 9(*a*) and 9(*b*), regardless of the turning angle of the steering wheel 36, it is possible to effectively absorb the impact inflicted on the head portion of the occupant always.

Figure 11:
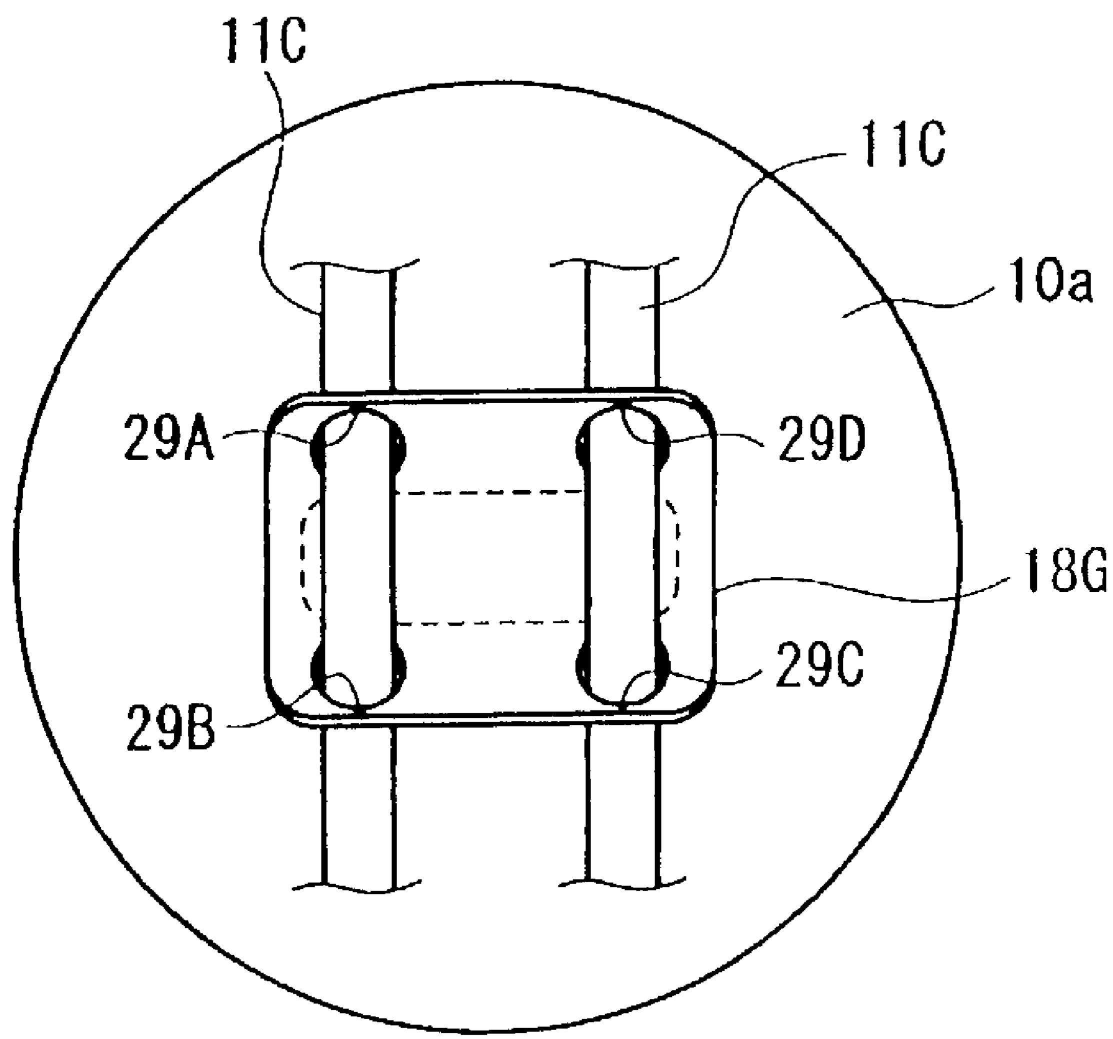
FIG. 11 is an explanatory view illustrating an arrangement of a strap according to an embodiment.

Further, in the embodiment shown in FIGS. 8(*a*) and 8(*b*), the strap inserting members 18D and 18D' are provided separately in the straps 11C and 11C'. Alternatively, in place of the strap inserting members 18D and 18D', a strap inserting member 18G having a substantially rectangular shape horizontally long and constructed in one body may be employed, as shown in FIG. 11. The strap inserting member 18G has openings 29A, 29B, 29C and 29D in the vicinity of the respective vertexes.

The openings 29A, 29B, 29C and 29D are arranged in the upper-left portion, the lower-left portion, the lower-right portion and the upper-right portion of the front panel 10*a*, respectively. The strap 11C is drawn through the openings 29A and 29B, and the strap 11C' is drawn through the openings 29D and 29C.

A central portion of the strap inserting member 18G is connected along the inner surface of the front panel 10*a* by sewing and the like.

Figure 12B:
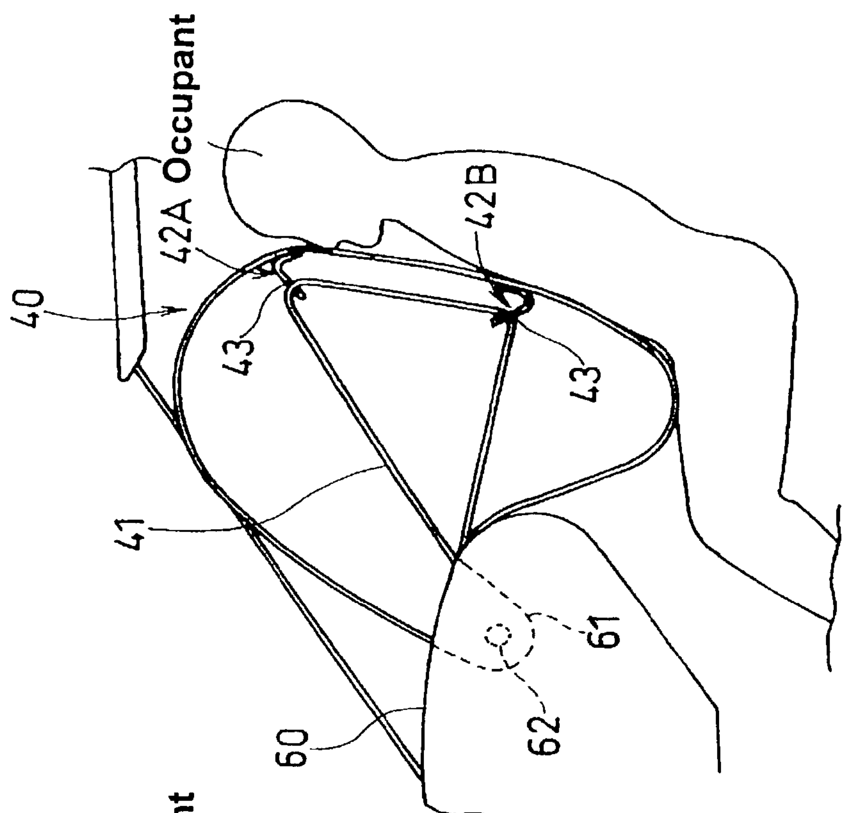
FIGS. 12(*a*) and 12(*b*) are explanatory views illustrating an operation of an airbag device for a passenger seat according to an embodiment.
Figure 12A:
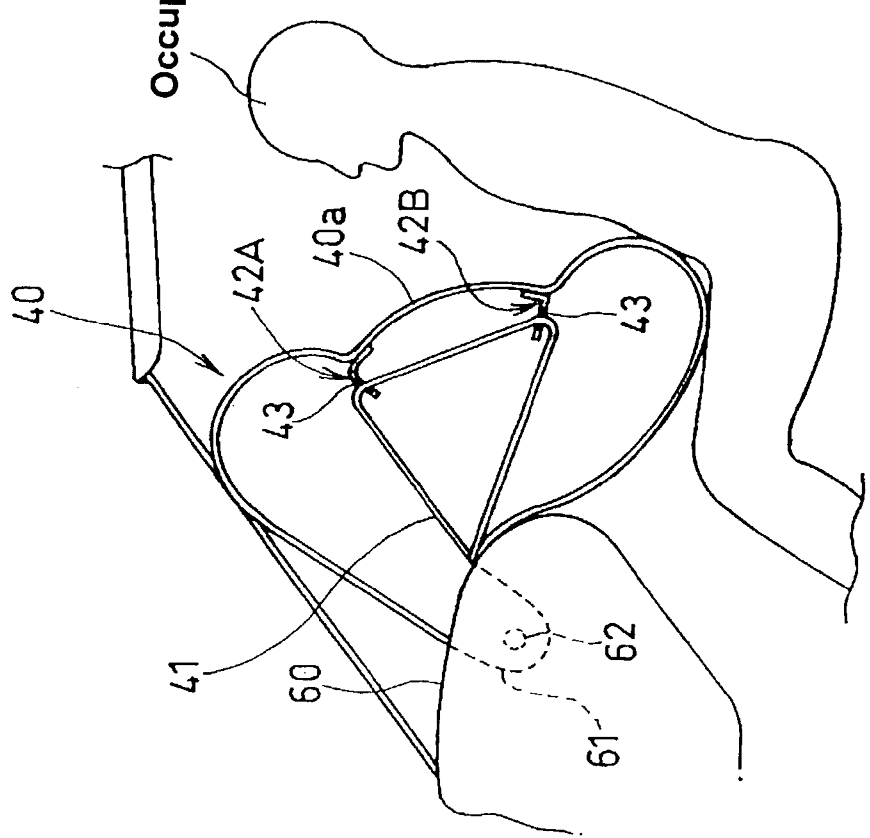

In the aforementioned embodiments, the present invention is applied to the airbag device for a driver seat of a vehicle. However, the present invention may be applied to various airbag devices such as an airbag device for a passenger seat and the like. FIGS. 12(*a*) and 12(*b*) are explanatory views illustrating an example that the present invention is applied to the airbag device for a passenger seat. FIG. 12(*a*) illustrates a state of the airbag device when the expansion of the airbag is completed, and FIG. 12(*b*) illustrates a state of the airbag device when the occupant is received by the airbag.

The airbag device shown in FIGS. 12(*a*) and 12(*b*) includes an airbag 40 for a passenger seat having a pyramid shape and capable of expanding toward the front side of the passenger seat from an upper portion of an instrument panel 60. In the airbag 40, a strap 41 is provided for connecting an occupant-facing surface 40*a* on the front end side of the airbag 40 to the rear end side of the airbag 40.

Strap inserting members 42A and 42B are provided in the upper portion and the lower portion of the inner surface of the occupant-facing surface 40*a*, respectively. The strap inserting members 42A and 42B are constructed similar to those of the strap inserting members 18A' and 18B' in FIG. 5, respectively. That is, each of the strap inserting members 42A and 42B has an opening 43 on the front end sides thereof, and the base side thereof is coupled along the inner surface of the occupant-facing surface 40*a* by sewing and like.

Both end sides of the strap 41 are coupled to the rear end side of the airbag 40, and the intermediate portion thereof is drawn through the openings 43 of the respective strap inserting members 42A, 42B. The intermediate portion of the strap 41 is movable in the longitudinal direction of the strap in the openings 43.

The airbag 40 is accommodated in a folded state in a case 61 having an open portion at an upper surface. In the case 61, an inflator 62 is provided. for expanding the airbag 40. A cover (not shown) is mounted on the upper open portion of the case. The case 61 is provided in an upper portion of the instrument panel 60 such that the upper surface of the cover is flush with the upper surface of the instrument panel 60.

In the airbag device for the passenger seat constructed as stated above, the airbag 40 presses and opens the cover by means of a gas from the inflator 62 in case of an emergency such as a vehicle collision, to be expanded inside the vehicle. As shown in FIG. 12(*a*), the airbag is unfolded toward the front side of the passenger seat from the upper portion of the instrument panel 60.

At that time, the upper portion and the lower portion of the occupant-facing surface 40*a* are connected to the rear end side of the airbag 40 by means of the strap 41. Thus, the forward expansion of the occupant-facing surface 40*a* is restricted to minimize the inner volume of the airbag 40. For this reason, even if the inflator 62 has a low-power, the airbag 40 can complete the unfolding or development rapidly.

When the occupant comes to contact with the expanded airbag 40, the lower portion of the body such as abdomen first comes to contact with the lower portion of the occupant-facing surface 40*a*. Then, the lower portion of the occupant-facing surface 40*a* receives the body of the occupant and retreats toward the rear end side of the airbag 40 while absorbing the kinetic energy of the occupant.

At that time, the lower half side of the strap restricting the forward expansion of the lower portion of the occupant-facing surface 40*a* becomes loose as the lower portion of the occupant-facing surface 40*a* retreats. Then, the lower half of the strap 41 is shifted by the loose portion toward the upper half side through the strap inserting members 42B and 42A by means of tension from the upper half of the strap 41 restricting the forward expansion of the upper portion of the occupant-facing surface 40*a*, thereby increasing the length of the upper half of the strap 41. Consequently, the restriction on the upper portion of the occupant-facing surface 40*a* by the upper half of the strap 41 is relieved, and thus the upper portion of the occupant-facing surface 40*a* is further expanded forwardly, as shown in FIG. 12(*b*)

As a result, the further expanded upper portion of the airbag 40 receives the head portion of the occupant coming to contact with the upper portion of the airbag 40, so that it is possible to absorb the impact inflicted on the head portion of the occupant more effectively.

As described above, according to the present invention, the strap limits the airbag device to protrude forwardly when expanded. When the lower portion of the expanded airbag receives the abdominal vicinity of the occupant, the upper portion of the airbag is further expanded toward the occupant side to receive the head portion of the occupant.

While the invention has been explained with reference to the specific embodiments, the explanation is illustrative and the invention is limited only by the appended claims.

What is claimed is:

1. An airbag device, comprising:

an airbag having a front portion facing an occupant, a rear portion opposite to the front portion, and upper and lower portions at the front portion, first and second strap inserting members situated inside the airbag and attached to the upper and lower portions to be spaced apart from each other, each of the first and second strap inserting members having a hole therein, an upper reinforcing cloth having an annular shape and attached to the front portion of the airbag, said first and second strap inserting members projecting outwardly from the upper reinforcing cloth, a lower reinforcing cloth having an annular portion fixed to the rear portion of the airbag, and ear portions projecting from the annular portion and located at portions corresponding to the upper and low portions, and a strap situated inside the airbag and having two ends attached to the ear portions of the lower reinforcing cloth fixed to the rear portion of the airbag, said strap passing through the holes of the first and second strap inserting members so that the strap can slide in the holes of the first and second strap inserting members when a force is applied to a portion of the airbag after inflation.

2. An airbag device according to claim 1, further comprising an inflator attached to the rear portion of the airbag for inflating the airbag.

3. An airbag device according to claim 1, further comprising annular reinforcing cloths attached to the first and second strap inserting members around the holes.

4. An airbag device comprising:

an airbag having a front portion facing an occupant, a rear portion opposite to the front portion, and upper and lower portions at the front portion, a first strap inserting member situated inside the airbag and attached to the upper to lower portions, said first strap inserting member having holes spaced apart from each other therein, a second strap inserting member with holes situated inside the airbag and attached to the upper to lower portions substantially parallel to the first strap inserting member, said holes of the second strap inserting member being spaced apart from each other, a first strap situated inside the airbag and having two ends attached to the rear portion of the airbag, said first strap passing through the holes of the first strap inserting member, and a second strap situated inside the airbag and attached to the rear portion thereof, said second strap slidably passing though the holes of the second strap inserting member and extending substantially parallel to the first strap so that the first strap can slide in the holes of the first strap inserting member and the second strap can slide in the holes of the second strap inserting member when a force is applied to a portion of the airbag after inflation.

5. An airbag device comprising:

an airbag having a front portion facing an occupant, a rear portion opposite to the front portion, and upper and lower portions at the front portion, one strap inserting member situated inside the airbag and attached to the upper to lower portions, said strap inserting member having a rectangular shape and four holes, said four holes being spaced apart from each other in the upper to lower portions and laterally spaced apart from each other, respectively, a first strap situated inside the airbag and having two ends attached to the rear portion of the airbag, said first strap passing through two of the four holes of the strap inserting member, and a second strap situated inside the airbag and attached to the rear portion thereof, said second strap slidably passing though the other two of the four holes and extending substantially parallel to the first strap so that the first strap can slide in the two holes and the second strap can slide in the other two holes when a force is applied to a portion of the airbag after inflation.

* * * * *